United States Patent [19]

Kashihara et al.

[11] Patent Number: 4,766,973
[45] Date of Patent: Aug. 30, 1988

[54] 4WD VEHICLE TORQUE DISTRIBUTION DEVICE INCORPORATING FRICTION ENGAGING DEVICE PROVIDING MULTI MODE OPERATION, AND METHOD FOR OPERATION THEREOF

[75] Inventors: Yuji Kashihara; Yutaka Taga, both of Toyota, Japan

[73] Assignee: Toyota Jidosha Kabushiki Kaisha, Toyota, Japan

[21] Appl. No.: 42,241

[22] Filed: Apr. 24, 1987

[30] Foreign Application Priority Data

May 1, 1986 [JP] Japan .................................. 61-102805
Jun. 5, 1986 [JP] Japan .................................. 61-130957

[51] Int. Cl.⁴ ............................................. B60K 17/34
[52] U.S. Cl. .................................. 180/249; 364/424.1
[58] Field of Search ............... 180/247, 233, 248, 249; 364/424.1

[56] References Cited

U.S. PATENT DOCUMENTS 4,466,502 8/1984 Sakai .................................. 180/247

FOREIGN PATENT DOCUMENTS 50-147027 11/1975 Japan .
55-72420 5/1980 Japan .
56-138020 10/1981 Japan .

Primary Examiner—John A. Pekar
Attorney, Agent, or Firm—Oblon, Fisher, Spivak, McClelland & Maier

[57] ABSTRACT

In a four wheel drive vehicle, this torque distribution device includes a friction engaging mechanism which controls drive torque distribution to the front vehicle wheels and/or to the rear vehicle wheels, and a servo device which receives an actuating hydraulic fluid pressure and which applies an engaging force to the friction engaging mechanism so as to cause it to be able to transmit torque. The engaging force for the friction engaging mechanism and the maximum torque transmission capacity thereof this provided both increase monotonically according to increase of the actuating hydraulic fluid pressure. This servo device includes first and second pistons which partially serve to define respective first and second pressure chambers, and which, when impelled by hydraulic fluid pressure in their respective first and second pressure chambers, both provide such engaging force for the friction engaging mechanism. When actuating hydraulic fluid pressure is supplied to two different combinations of the first pressure chamber and the second pressure chamber, the relationships between the magnitude of the engaging hydraulic fluid pressure and the engaging force for the friction engaging mechanism and the maximum torque transmission capacity of the friction engaging mechanism differ. The combinations may be the individual pressure chambers by themselves, or may be one of the chambers and the two of them together. A three stage specialization of this device, and the method of operation thereof, are also described.

6 Claims, 8 Drawing Sheets

4WD VEHICLE TORQUE DISTRIBUTION DEVICE INCORPORATING FRICTION ENGAGING DEVICE PROVIDING MULTI MODE OPERATION, AND METHOD FOR OPERATION THEREOF

BACKGROUND OF THE INVENTION

The present invention relates to a torque distribution device and to a method of operation thereof, for a vehicle adapted for four wheel drive operation and incorporating a four wheel drive power transmission system, and more particularly relates to such a torque distribution device and method of operation thereof for a vehicle such as an automobile incorporating such a four wheel drive power transmission system, said torque distribution device and method providing several ratios of magnitude of actuating signal, such as the magnitude of a hydraulic fluid pressure actuating signal, versus the magnitude of torque transmission capablity provided according thereto for determining torque distribution between the front and the rear vehicle wheels.

The present invention has been described in Japanese Patent Applications Ser. Nos. 61-102805 and 61-130957 (1986), both filed by an applicant the same as the entity assigned or owed duty of assignment of the present patent application; and the present patent application hereby incorporates by reference the text of said Japanese Patent Applications and the claims and the drawings thereof; copies of which are appended to the present application.

Nowadays a greatly increasing number of automotive vehicles are being constructed with four drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front - rear differential device is provided in order to provied a differential action between said front vehicle wheels (considered as a pair) and said rear vehicle wheels (also considered as a pair) when the vehicle is turning around a curve, in order to eliminate the possibility of the occurrence of so called tight corneenr braking phenomenon created by the difference in the turning radiuses of the front wheels of the vehicle and the rear wheels thereof (and also for various other reasons). And such provision of such a central or front - rear differential device is effective for achieving this result. Further, it has been practiced to provide an automatic transmission system to a vehicle which is equipped with such a four wheel drive type transmission. Such a type of structure is disclosed, for example, in Japanese Patent Application Laying Open Publication Ser. No. 56-138020 (1981). Further, it is per se conventional to provide, to such a center differential device, a torque distribution control clutch such as a central differential control clutch, which serves for regulating the distribution of the drive torque produced by the engine of the vehicle between the rear wheels of the vehicle (taken as a combination) and the front wheels of the vehicle (taken as a combination). Such a type of construction is disclosed, for example, in Japanese Patent Application Laying Open Publication Serial No. 50-14027 (1975) and in Japanese Patent Application Laying Open Publication Ser. No. 55-72420 (1980). Such a torque distribution control clutch such as a central differential control clutch is typically controlled by a hydraulically operated servo device, so that the engagement pressure of said torque distribution control clutch, i.e. the maximum amount of torque that said torque distribution control clutch can transmit, which defines the amount of torque redistribution which said torque distribution control clutch can provide between the rear wheels of the vehicle (taken as a combination) and the front wheels of the vehicle (taken as a combination), is regulated by the magnitude of an actuating hydraulic fluid pressure, Such an actuating hydraulic fluid pressure is typically provided by a control system such as a hybrid electrical/hydraulic control system which may include a microcomputer.

However, a problem that arises with such a system is that said control system typically controls the engagement pressure of said torque distribution control clutch according to various vehicle operational parameters such as for example the torque amount that is being inputted to the central differential device, the throttle opening of the engine of the vehicle (which is typically taken as a parameter representative of engine load), the vehicle road speed, the shift stage of the transmission that is currently engaged, the angle of the steering system of the vehicle, and the like. Accordingly, because of the wide variation that is possible in these vehicle operating parameters, typically it is required for the amount of torque redistribution which said torque distribution control clutch can provide between the rear wheels of the vehicle (taken as a combination) and the front wheels of the vehicle (taken as a combination), i.e. the maximum amount of torque that said torque distribution control clutch can transmit or the engagement pressure of said torque distribution control clutch, to be relatively accurately varied over a relatively large operational range. Now, conventionally the servo actuator for such a torque distribution control clutch has comprised a single piston sliding in a single cylinder bore, and has had a single pressure chamber to which the actuating hydraulic fluid pressure is supplied. Conventionally, therefore, the actuating hydraulic fluid pressure for said torque distribution control clutch has been required to be adjusted within relatively narrow limits and relatively accurate, over a relatively wide range. Since the maximum range of said actuating hydraulic fluid pressure which is provided by the control system for the servo device is inherently restricted by the value of line pressure, the accuracy of control of said actuating hydraulic fluid pressure which is required is very high, and this provides a major stumbling block with regard to implementing such a system.

SUMMARY OF THE INVENTION

The inventors of the present invention have considered the various problems detailed above in the aforementioned type of four wheel drive type vehicle incorporating such a four wheel drive power transmission system and fitted with such an automatic transmission system.

Accordingly, it is the primary object of the present invention to provide an improved vehicle torque distribution device for a four wheel drive type vehicle, and corresponding method for operating such a device, which avoid the problems detailed above.

It is a further object of the present invention to provide such a vehicle torque distribution device and method, which do not require unduly fine control of the magnitude of the actuating hydraulic fluid pressure which is supplied, while still maintaining a suitably wide range of operational characteristic for torque distribution and a suitably fine regulation of said operational characteristic for torque distribution.

It is yet further object of the present invention to provide such a vehicle torque distribution device and method, which provides accurate and positive control of the amount of torque distribution between the combination of the front wheels of the vehicle and the combination of the rear wheels of the vehicle.

According to the most general device aspect of the present invention, these and other objects are attained by, for a four wheel drive vehicle with two front wheels, two rear wheels, and an engine, rotational power from said engine being provided to the combination of the front wheels of said vehicle and also to the combination of the rear wheels of said vehicle: a torque distribution device, comprising: (a) a friction engaging mechanism which controls drive torque distribution to at least one of said front and said rear vehicle wheel combinations; and: (b) a servo device which receives an actuating hydraulic fluid pressure and which applies an engaging force to said friction engaging mechanism so as to cause said friction engaging mechanism to be endowed with torque transmission capacity, said engaging force for said friction engaging mechanism and the maximum torque transmission capacity of said friction engaging mechanism thus provided both increasing monotonically according to increase of said actuating hydraulic fluid pressure; (c) said sevo device comprising: (c1) a first piston which partially serves to define a first pressure chamber, and which, when impelled by hydraulic fluid pressure in said first pressure chamber in the direction to increase the volume of said first pressure chamber, provides such engaging force for said friction engaging mechanism; and: (c2) a second piston which partially serves to define a second pressure chamber, and which, when impelled by hydraulic fluid pressure in said second pressure chamber in the direction to increase the volume of said second pressure chamber, provides such engaging force for said friction engaging mechanism; and wherein: (d) when said actuating hydraulic fluid pressure is supplied to a first combination and to a second combination of said first pressure chamber and said second pressure chamber, the relationships between the magnitude of said engaging hydraulic fluid pressure and said engaging force for said friction engaging mechanism and the maximum torque transmission capacity of said friction engaging mechanism differ; and, according to the most general method aspect of the present invention, these and other objects are attained by, for a four wheel drive vehicle with two front wheels, two rear wheels, and an engine, rotational power from said engine being provided to the combination of the front wheels of said vehicle and also to the combination of the rear wheels of said vehicle, and further comprising a friction engaging mechanism, which controls drive torque distribution to at least one of said front and said rear vehicle wheel combinations, and a servo device which receives an actuating hydraulic fluid pressure and which applies an engaging force to said friction engaging mechanism so as to cause said friction engaging mechanism to be endowed with torque transmission capacity, said engaging force for said friction engaging mechanism and the maximum torque transmission capacity of said friction engaging mechanism thus provided both increasing monotonically according to increase of said actuating hydraulic fluid pressure; said servo device comprising: a first piston which partially serves to define a first pressure chamber, and which, when impelled by hydraulic fluid pressure in said first pressure chamber in the direction to increase the volume of said first pressure chamber, provides such engaging force for said friction engaging mechanism; and a second piston which partially serves to define a second pressure chamber, and which, when impelled by hydraulic fluid pressure in said second pressure chamber in the direction to increase the volume of said second pressure chamber, provides such engaging force for said friction engaging mechanism; and wherein, when said actuating hydraulic fluid pressure is supplied to a first combination and to a second combination of said first pressure chamber and said second pressure chamber, the relationships between the magnitude of said engaging hydraulic fluid pressure and said engaging force for said friction engaging mechanism and the maximum torque transmission capacity of said friction engaging mechanism differ: a torque distribution method, wherein: when there exists a requirement for a first relationship between the magnitude of said engaging hydraulic fluid pressure and said engaging force for said friction engaging mechanism and the maximum torque transmission capacity of said friction engaging mechanism, said actuating hydraulic fluid pressure is supplied to said first combination of said first pressure chamber and said second pressure chamber; while, when there exists a requirement for a second relationship between the magnitude of said engaging hydraulic fluid pressure and said engaging force for said friction engaging mechanism and the maximum torque transmission capacity of said friction engaging mechanism, said second relationship being different from said first relationship, said actuating hydraulic fluid pressure is supplied to said second combination of said first pressure chamber and said second pressure chamber.

According to such a device and such a method, when there exists a requirement for the first relationship between the magnitude of said engaging hydraulic fluid pressure and said engaging force for said friction engaging mechanism and the maximum torque transmission capacity of said friction engaging mechanism, then the actuating hydraulic fluid pressure for the friction engaging mechanism is supplied to said first combination of said first pressure chamber and said second pressure chamber, and thereby said first relationship is established. On the other hand, when there exists a requirement for said second relationship between the magnitude of said engaging hydraulic fluid pressure and said engaging force for said friction engaging mechanism and the amximum torque transmission capacity of said friction engaging mechanism, then said actuating hydraulic fluid pressure for said friction engaging mechanism is supplied to said second combination of said first pressure chamber and said second pressure chamber, and thereby said second relationship is established. Typically, these first and second relationships will be relationships of proportionality or relationships of substantial proportionality, and the constant of proportionality of said first relationship will be different from the constant of proportionality of said second relationship. Thereby, by selecting one or the other of the first and the second relationship for utilization according to the particular operational circumstances which currently pertain, it is possible to maintain a suitably fine regulation of the operational characteristic for torque distribution of the friction engaging device, while not requiring unduly fine control of the magnitude of the actuating hydraulic fluid pressure which is supplied. And by switching between one or the other of the first and the second relationship, it is possible to maintain a suitably wide range of said operational characteristic for torque distribution of said friction engaging device, thus providing accurate and positive control of the amount of torque distribution between the combination of the front wheels of the vehicle and the combination of the rear wheels of the vehicle.

Further, according to a particular device specialization of the present invention, the above specified and other objects may be more particularly attained by a vehicle torque distribution device as described above, wherein said first combination of said first pressure chamber and said second pressure chamber is said first pressure chamber, and said second combination of said first pressure chamber and said second pressure chamber is said second pressure chamber; and, in this case, the effective pressure receiving area which said first piston presents to said first pressure chamber should be substantially different from the effective pressure receiving area which said second piston presents to said second pressure chamber. Or, as an alternative, said first combination of said first pressure chamber and said second pressure chamber may be said first pressure chamber, and said second combination of said first pressure chamber and said second pressure chamber may be said first pressure chamber and said second pressure chamber. In any case, according to a particular device specialization of the present invention, the above specified and other objects may be more particularly attained by a vehicle torque distribution device as described above, wherein the effective pressure receiving area which said first piston presents to said first pressure chamber is substantially different from the effective pressure receiving area which said second piston presents to said second pressure chamber; and, in such a case, when said actuating hydraulic fluid pressure is supplied to said first pressure chamber, to said second pressure chamber, and to said first pressure chamber and said second pressure chamber, the relationships between the magnitude of said engaging hydraulic fluid pressure and said engaging force for said friction engaging mechanism and the maximum torque transmission capacity of said friction engaging mechanism will all differ. In such a case, when there exists a requirement for a first relationship between the magnitude of said engaging hydraulic fluid pressure and said engaging force for said friction engaging mechanism and the maximum torque transmission capacity of said friction engaging mechanism, said actuating hydraulic fluid pressure is supplied to said first pressure chamber; when there exists a requirement for a second relationship between the magnitude of said engaging hydraulic fluid pressure and said engaging force for said friction engaging mechanism and the maximum torque transmission capacity of said friction engaging mechanism, said second relationship being different from said first relationship, said actuating hydraulic fluid pressure is supplied to said second pressure chamber; and, when there exists a requirement for a third relationship between the magnitude of said engaging hydraulic fluid pressure and said engaging force for said friction engaging mechanism and the maximum torque transmission capacity of said friction engaging mechanism, said third relationship being different from said first relationship and said second relationship, said actuating hydraulic fluid pressure is supplied to said first pressure chamber and also to said second pressure chamber. This provides a system capable of three mode operation.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals unless otherwise so specified, denote the same parts and chambers and flow chart steps and so on in the various figures relating to one preferred embodiment, and like parts and chambers and flow chart steps and so on in the various figures relating to different preferred embodiments; and:

DESCRIPTION OF THE PREFERRED EMBODIMENTS

The present invention will now be described with reference to the preferred embodiments of the device and of the method thereof, and with reference to the figures.

Overall Vehicle Power Train Structure

Figure 1:
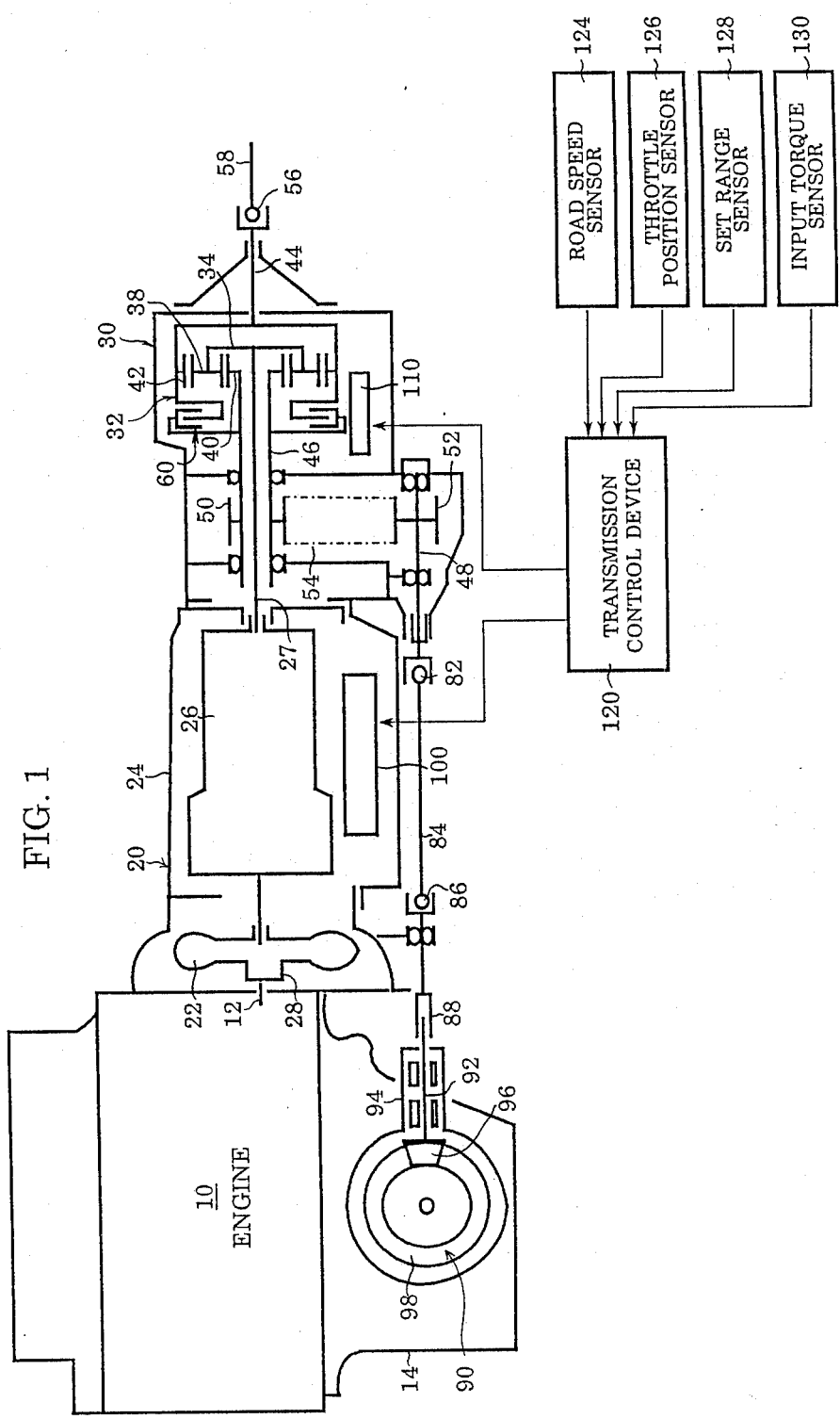
FIG. 1 is a schematic longitudinal skeleton view of a vehicle power train and of a control system therefor which incorporate the first preferred embodiment of the vehicle torque distribution device of the present invention, for practicing the first preferred method embodiment.

FIG. 1 is a schematic longitudinal skeleton view of a power train of a vehicle, which incorporates the first preferred embodiment of the four wheel drive vehicle torque distribution device of the present invention, said device performing the first preferred method embodiment. In this figure, the reference numeral 10 denotes an internal combustion engine of the vehicle, which is mounted, in this exemplary case, longitudinally in the front engine room (not particularly shown) of said vehicle. And the reference numeral 20 denotes an automatic speed change device (automatic transmission) of a per se known type mounted to the rear of the engine 10, while 30 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 30 being selectably either not provided at all, being provided to a limited degree, or being fully provided, as will be explained in detail hereinafter.

In more detail, the automatic speed change device 20 incorporates a fluid torque converter 22 of a per se known construction, and the power input member 28 of this fluid torque converter 22 is connected via an input shaft 12 to and receives rotational power from a crank shaft of the internal combustion engine 10. And the fluid torque converter 22 is housed within a torque converter housing fitted against and secured to the main body of the internal combustion engine 10, while the automatic speed change device 20 comprises a gear transmission mechanism 26, which is likewise housed within a speed change device housing 24 fitted against and secured to the torque converter houring. The input shaft of the gear transmission mechanism 26 is connected to and receives rotational power from the power output shaft of the fluid torque converter 22; and thereby the gear transmission mechanism 26 receives rotational power from the internal combustion engine 10, with a certain degree of slippage and also torque amplification being provided for said rotational power by the fluid torque converter 22 (unless a lock up clutch thereof, if provided thereto, is activated; such arrangements are not particularly shown) as is per se conventional. This gear transmission mechanism 26 may be for the purposes of this specification be of a per se known type incorporating various planetary gear mechanisms and friction engaging mechanisms such as clutches and brakes and, according to selective actuation of said friction engaging mechanisms provided in a per se known manner by an electrically controlled electric/hydraulic control mechanism 100 of a per se known sort including various speed change valves and/or solenoids and so one, provides any one of a plurality of speed reduction stages between its said power input shaft and its power output shaft, its said power output shaft driving the four wheel drive power transfer device 30.

This four wheel drive power transfer device 30 incorporates a center differential device 32 of a planetary gear wheel type for providing full time differential action between the front wheels of the vehicle and the rear wheels of the vehicle during the full time four wheel drive operation thereof. Now the detail construction of this center differential device 32 will be explained. It comprises a sun gear 40, a ring gear 42, a carrier 34, and a plurality of planetary pinions 38 which are rotatbly mounted to said carrier 34 and meshed between the sun gear 40 and the ring gear 42 and which perform planetary movement between the same in a per se known manner. The carrier 34 functions as an input member for this center differential device 32, and said carrier 34 is rotationally connected to the output shaft of the gear transmission mechanism 26 via a transfer shaft 27 which passes through the central axial holes of the hollow sun gear 40 and of the intermediate front wheel drive shaft 46 which will be described shortly. The ring gear 42 functions as one power output member for the center differential device 32 for supplying power to the rear wheels of the vehicle, and is rotationally connected to a rear wheel power output shaft 44 which extends out of the four wheel drive power transfer device 30 in the direction to the right as seen in FIG. 1, i.e. towards the rear of the vehicle in this particular exemplary implementation. Such sun gear 40 functions as another power output member for the center differential device 32 for supplying power to the front wheels of the vehicle, and is rotationally connected to a sleeve shaped intermediate front wheel drive shaft 46. This intermediate front wheel drive shaft 46 is hollow and is fitted around the transfer shaft 27, and on its outside there if fixedly mounted a sprocket wheel 50. An endless chain 54 is fitted around this sprocket wheel 50 and also around another sprocket wheel 52 provided below said sprocket wheel 50, from the point of view of the figure and in the actual vehicle body also, and the central axis of this sprocket wheel 52 extends parallel to the central axis of the sprocket wheel 50. This sprocket wheel 52 is fixedly mounted on a front wheel power output shaft 48, one end of which protrudes from the housing of this four wheel drive power transfer device 30 in the leftwards direction in the figure, i.e. towards the front end of the vehicle in this particular exemplary implementation.

Thus, the power distribution ratio (drive torque distribution) between the intermediate front wheel drive shaft 46 and the rear wheel power output shaft 44, when this four wheel drive power transfer device 30 is operating freely (i.e. when a clutch 60 to be described shortly is in the fully released condition), is determined by the relative tooth counts of the sun gear 40 and the ring gear 42 by the expressions $Rr=1/(1+Rg)$ and $Rf=Rg(1+Rg)$, where Rr is the rear wheel distribution ratio, Rf is the front wheel distribution ratio, and Rg is the ratio of the number of teeth on the sun gear 40 to the number of teeth on the ring gear 42. Because the number of teeth on the sun gear 40 is naturally greater than the number of teeth on the ring gear 42, thus, providing that the number of teeth on the sprocket wheel 50 and the number of teeth on the sprocket wheel 52 are the same, and the gearing ratios of the differential devices for the front pair of vehicle wheels and for the rear pair of vehicle wheels are the same, this four wheel drive power transfer device 30 is of the type which distributes a larger amount of torque to the rear vehicle wheels than to the front vehicle wheels.

Within the four wheel drive power transfer device 30 there is provided a hydraulically operated wet type clutch 60, which selectively rotationally connects together the sun gear 40 and the ring gear 42, either completely or partially, or alternatively allows said members to rotate freely with respect to one another. This wet clutch 60, the construction of which will be explained in detail shortly, is selectively operated to a greater or lesser engagement extent (this expression relates to the maximum torque transmission capability of said wet clutch 60) by supply of actuating hydraulic fluid pressure of a greater or lesser pressure value from an electrically actuated electric/hydraulic control device 110, an exemplary construction for which will be outlined hereinafter. Accordingly, the four wheel drive power transfer device 30, which receives rotational power input from the gear transmission mechanism 26 and outputs said rotational power to the rear wheel power output shaft 44 and to the front wheel power output shaft 48, can be caused either to provide (in the case that the wet clutch 60 is fully disengaged) substantially free differential action for distributing said rotational power between said rear wheel power output shaft 44 and said front wheel power output shaft 48, or not to provide (in the case that the wet clutch 60 is fully engaged) any such differential action at all and just to drive said shafts 44 and 48 independently, or to provide (in the case that the wet clutch 60 is partially but not fully engaged) a condition intermediate between these two extreme conditions, so as to partly allow the center differential device 32 to provide its differential action for distributing said rotational power between said rear wheel power output shaft 44 and said front wheel power output shaft 48 to some extent, while being somewhat impeded by the dragging action of the clutch 60, up to a certain maximum dragging action amount, which is determined by the maximum torque transmission capacity of said wet clutch 60 in the particular operational circumstances.

Via a universal joint 56 of a per se known sort, the rear end of the rear wheel power output shaft 44 rotationally drives the front end of a rear wheel propeller shaft 58. And the rear end of this rear wheel propeller shaft 58 is connected via another universal joint (not particulalry shown) to a differential device, (not particularly shown either), for driving the rear wheels (also not shown) of the vehicle.

Via a universal joint 82 also of a per se known sort, the front end of the front wheel power output shaft 48 rotationally drives the rear end of a front wheel propeller shaft 84. Thus, this front wheel propeller shaft 84 extends alongside and generally below the casing 24 of the automatic speed change device 20 including the fluid torque converter 22 therein, roughly parallel to the longitudinal axis thereof and on one side thereof. The front end of this front wheel propeller shaft 84 is rotationally connected, via another universal joint 86 also of a per se known sort, via a short intermediate shaft which is supported from the torque converter casing by means of a bearing assembly, and via yet another universal joint 88 also of a per se known sort, to the outer end of a drive pinion shaft 92 which constitutes the power input shaft of a front differential device 90 which drives the front wheels (not shown) of the vehicle. This drive pinion shaft 92 is also rotatably supported at its intermediate portion from the casing 94 of the front differential device 90 (this casing 94 is integrally formed with the oil pan of the internal combustion engine 10), and the inner end of this drive pinion shaft 92 is provided with a drive pinion 96 which is constituted as a bevel gear, with said drive pinion 96 being meshingly engaged with a driven ring gear 98 of the front differential device 90.

Operation of this Power Train

This vehicle power train operates as follows. When the clutch 60 of the four wheel drive power transfer device 30 is operated by the electrically actuated electric/hydraulic control device 110 so as to not at all rotationally connect together the sun gear 40 and the ring gear 42, then the center differential device 32 functions so as to provide its differential effect between the rear wheel power output shaft 44 and the intermediate front wheel drive shaft 48 in full measure, i.e. so as to receive rotational power provided by the engine 10 of the vehicle and transmitted to said four wheel drive power transfer device 30 via the automatic speed change device 20, and to distribute said rotational power, while providing a non damped differential effect, between the rear wheels of the vehicle taken as a combination and the front wheels of the vehicle taken as a combination. On the other hand, when the clutch 60 of the four wheel drive power transfer device 30 is operated by the electrically actuated electric/hydraulic control device 110 so as to completely rotationally connect together the sun gear 40 and the ring gear 42, i.e. so as to provide an effectively unlimited degree of torque transmission, then the center differential device 32 functions so as to provide no such differential effect at all between the rear wheel power output shaft 40 and the intermediate front wheel drive shaft 42, i.e. so as to distribute the rotational power provided from the engine 10 via the automatic speed change device 20 directly to the rear wheels 58 of the vehicle taken as a combination and also to the front wheels 28 of the vehicle taken as a combination in an even fashion without any provision of any differential effect at all. In the intermediate case between these two extremes, when said clutch 60 of said four wheel drive power transfer device 30 is operated by said electrically actuated electric/hydraulic control device 110 so as somewhat to rotationally connect together said sun gear 40 and said ring gear 42, i.e. so as to provide a certain relatively limited degree of dragging or torque transmitting effect between these members, then said center differential device 32 functions so as to provide its differential effect between said rear wheel power output shaft 44 and said intermediate front wheel drive shaft 48 to a relatively limited or partial degree, i.e. so as to receive rotational power provided by said engine 10 of said vehicle and transmitted to said four wheel drive power transfer device 30 via said automatic speed change device 20, and to distribute said rotational power, while providing a partially damped differential effect, between said rear wheels of said vehicle taken as a combination and said front wheels of said vehicle taken as a combination.

Figure 2:
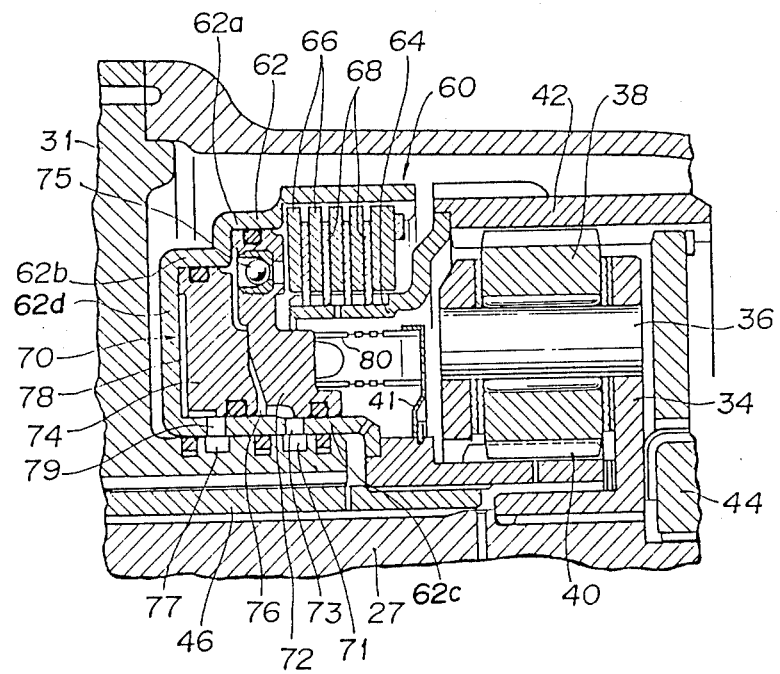
FIG. 2 is a partial longitudinal sectional view of a torque transfer clutch which is provided toaa center differential device of the FIG. 1 power train, and of an actuating servo device for said torque transfer clutch, for showing details of their constructions, said torque transfer clutch and said actuating servo device therefor being incorporated in said first preferred embodiment of the vehicle torque distribution device of the present invention.

The Construction of the Central Differential Control Clutch 60 in the First Preferred Embodiment In FIG. 2, there is shown a cross sectional view of the four wheel drive power transfer device 30, of its central differential control clutch 60, and of a servo device 70 for said clutch 60, as incorporated in the first preferred embodiment of the torque distribution device of the present invention, to which the first preferred embodiment of the method of operation thereof of the present invention is applied; however, this particular arrangement should not be taken as unduly limitative of the present invention, as other possibilities for these structures could also be implemented, in alternative embodiments. In this figure, the central differential control clutch 60 is shown as being a hydraulic servo type wet clutch, comprising: a clutch drum member 62 which is rotationally fixed with respect to the sun gear 40 of the center differential device 32; a clutch sleeve member 64 which is rotationally fixed with respect to the ring gear 42 of said center differential device 32; a set of clutch plates 66 which are fitted within and are rotationally fixed with respect to said clutch drum member 62, thus being rotationally fixed with respect to said sun gear 40 of said center differential device 32; another set of clutch plates 68 which are mutually interleaved in a sandwiched arrangement with said first set of clutch plates 66 and which are rotationally fixed with respect to said clutch sleeve member 64, thus being rotationally fixed with respect to said ring gear 42 of said center differential device 32; and a servo device 70 which will be explained in detail shortly. Thus, when the sets 66 and 68 of clutch plates are squeezed together by the servo device 70 as will be explained in detail shortly, torque transmission between the sun gear 40 and the ring gear 42 of the center differential device 32 is provided in a degree corresponding to the degree of squeezing together of said sets 66 and 68 of clutch plates, i.e. in a degree corresponding to the total force acting to squeeze the sandwich of said sets 66 and 68 of clutch plates together.

The servo device 70 provided for thus pressing and squeezing together said sets 66 and 68 of clutch plates is of a double chamber type, having, in these first preferred device and method embodiments, a two way functional capability, and said servo device 70 comprises twin pressure chambers 76 and 78 and twin servo pistons 72 and 74, all of these members and chambers being annular and the pressure chamber 76 having the larger effective pressure receiving area while the pressure chamber 72 has the smaller effective pressure receiving area. The servo pistons 72 and 74, in series, confront the sandwiched together sets 66 and 68 of clutch plates, for opposing said clutch plate sets 66 and 68 and for pressing them together, when said servo pistons 72 and 74 are biased in their direction (rightwards in FIG. 2). And, when one or the other of the pressure chambers 76 and 78 is pressurized with hydraulic fluid, it presses the servo piston 72 against the clutch plate sets 66 and 68 and squeezes them together. A spring 80, which in fact is an annular spring, and which bears upon a spring retainer member 41 fitted to an extension portion of the sun gear 40, is provided for biasing said servo pistons 72 and 74 in the leftwards direction as seen in FIG. 2, so as to reduce the size of the pressure chambers 76 and 78. Thereby, when no substantial hydraulic fluid pressure is supplied to either one of said pressure chambers 76 and 78, under the biasing action of the spring 80 the servo pistons 72 and 74 are both biased in the leftwards direction as seen in the drawing, so as to not substantially compress the superposed sandwich of the clutch plate sets 66 and 68 and thus to let said clutch plate sets 66 and 68 be not substantially mutually engaged; and, thereby, no substantial degree of torque transmission between the sun gear 40 and the ring gear 42 of the center differential device 32 is provided. On the other hand, when a substantial degree of hydraulic fluid pressure is supplied to one or the other of pressure chambers 76 and 78, one or both of the servo pistons 72 and 74 is biased, against the biasing action of the spring 80 which is overcome, in the rightwards direction as seen in the drawing, so that said servo piston or pistons 72 and/or 74 press against and compress the superposed sandwich of the clutch plate sets 66 and 68 with a force determined according to the magnitude of the pressure value supplied to said pressure chambers 76 and 78, thereby causing said clutch plate sets 66 and 68 to be mutually engaged together with a torque transmission capability determined according to said magnitude of said pressure value supplied to said pressure chambers 76 and 78; and, thereby, torque transmission between the sun gear 40 and hte ring gear 42 of the center differential device 32 is provided, similarly with a magnitude determined according to the magnitude of the pressure value supplied to the pressure chamber 76 or 78.

In more detail, the clutch drum 62 is formed with a first hollow cylindrical portion 62a of large radius axially proximate to its right side portion as seen in FIG. 2 to which the clutch plates 66 are mounted, further is formed with a second hollow cylindrical portion 62b of smaller radius axially proximate to its said larger radius portion 62a, and yet further is formed with a third cylindrical portion 62c of yet smaller radius which joins the main body of said clutch drum 62 to the sun gear 40. The first larger radius piston 72 is formed as a toroidal disk member, and its outer cylindrical surface is slidably mounted in the inner cylindrical surface of said first larger radius cylindrical drum portion 62a with a hydraulic seal therebetween being provided by a seal member, while its inner cylindrical surface is slidably mounted over said third cylindrical portion 62c with a hydraulic seal therebetween likewise being provided by a seal member. And the second smaller radius piston 74 is likewise formed as a toroidal disk member, with its outer radius smaller than that of the first larger radius piston 72 but with its inner radius substantially the same, and its outer cylindrical surface is slidably mounted in the inner cylindrical surface of the second smaller radius cylindrical drum portion 62b with a hydraulic seal therebetween being provided by a seal member, while its inner cylindrical surface is also slidably mounted over said third cylindrical portion 62c with a hydraulic seal therebetween likewise being provided by a seal member. Thereby the first effectively larger pressure chamber 76 is defined between the first larger radius piston 72 and the second smaller radius piston 74, in cooperation with the first larger radius cylindrical drum portion 62a, the second smaller radius cylindrical drum portion 62b, and the third cylindrical portion 62c of the clutch drum 62; and the effective pressure receiving area of said first effectively larger pressure chamber 76 is the area of the left side in FIG. 2 of said first larger radius piston 72. The second effectively smaller pressure chamber 78 is defined between the second smaller radius piston 74 and the end portion 62d of the clutch drum 62, in cooperation with the second smaller radius cylindrical drum portion 62b and the third cylindrical portion 62c of said clutch drum 62; and the effective pressure receiving area of said second effectively smaller pressure chamber 78 is the area of the left side in FIG. 2 of said second smaller radius piston 74.

Figure 3:
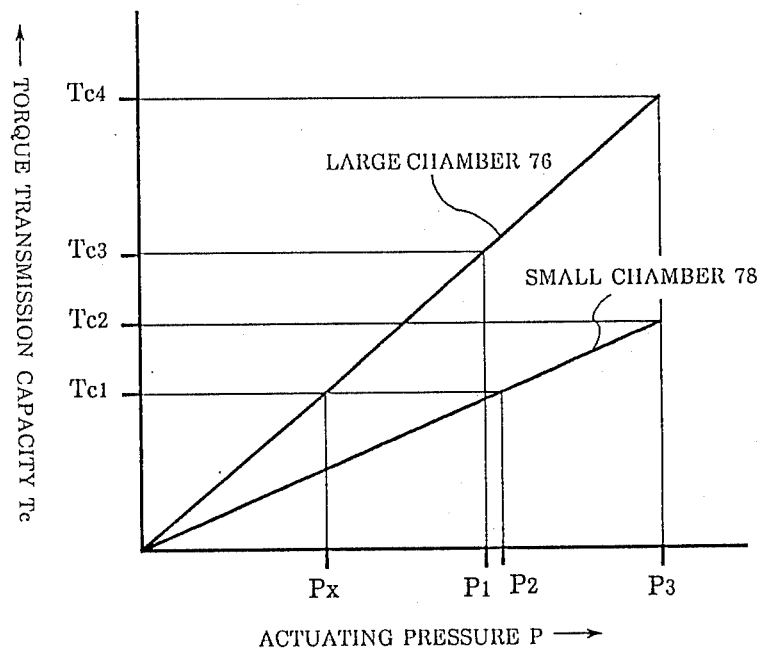
FIG. 3 is a graph which shows along the vertical axis the magnitude of the torque transmission capacity which is being caused to be provided between two clutch plate sets of the FIG. 2 torque transfer clutch by their being squeezed together according to the pressure of a piston member upon them, and which shows along the horizontal axis the magnitude of the actuating hydraulic fluid pressure which is being supplied ot one or another of two pressure chambers of said actuating servo device, which is for providing such squeezing action by said piston.

In other words, when actuating hydraulic fluid pressure is supplied to the first effectively larger pressure chamber 76, which when done is so done by supplying said actuating hydraulic fluid pressure via a port 72 formed in the housing 31 of this four wheel drive power transfer device 30 and via a port 73 formed in the third cylindrical portion 62c of the clutch drum 62, then the ratio of the magnitude of the torque transmission capacity thus caused to be provided between the clutch plate sets 66 and 68 by the first larger radius piston 72, which is displaced rightwards in FIG. 2, squeezing them together to the magnitude of the supplied actuating hydraulic fluid pressure is determined by the area of said first larger radius piston 72 and is relatively high, as illustrated in the graph of FIG. 3 which will be described later; while, on the other hand, when actuating hydraulic fluid pressure is supplied to the effectively smaller pressure chamber 78, which when done is so done by supplying said actuating hydraulic fluid pressure via a port 77 formed in the housing 31 of this four wheel drive power transfer devcie 30 and via a port 79 formed in the third cylindrical portion 62c of the clutch drum 62, then the ratio of the magnitude of the torque transmission capacity thus caused to be provided between the clutch plate sets 66 and 68 by the first larger radius piston 72, which is displaced rightwards in FIG. 2 by the pushing action of the second smaller radius piston 74 which also is displaced rightwards in FIG. 2, squeezing said clutch plate sets 66 and 68 together tot he magnitude of the supplied actuating hydraulic fluid pressure is determined by the area of said second smaller radius piston 74 and is relatively low, as also illustrated in the graph of FIG. 3 as will be described later. Drain check valve 75 is provided in and through the first larger radius piston 72.

The electrically actuated electric/hydraulic control device 110, to define its action in a functional sense, supplies a hydraulic fluid pressure of any desired pressure level from substantially zero up to line pressure to either one of the larger and the smaller pressure chambers 76 and 78 of this servo device 70, according to the value of an electrical control signal or signals supplied to it; this electric signal may be a pulse signal or signals, and the duty ratio of said pulse signal or signals may control the pressure supplied to one or the other of said larger and smaller pressure chambers 76 and 78 of the servo device 70, for example. Thus, by varying the value of said electrical signal or signals, it is possible to vary the degree of torque transmission between the sun gear 40 and the ring gear 42 of the center differential device 32 between substantially zero and a substantially maximum value, in each of two operational modes, in the case of these first preferred embodiments of the present invention. This controlling electrical signal or signals is supplied from a transmission control device 120, now to be explained.

The Transmission Control System

Referring to FIG. 1, it will be seen that the following detectors and sensors are provided to this system. A road speed sensor 124 detects a value representative of the road speed of the vehicle by measuring the rotational speed of a member rotationally coupled to the rear wheel power output shaft 44, or the like, and outputs an electrical signal representative thereof. A throttle position sensor 126 detects a value representative of the current load on the internal combustion engine 10 by measuring the opening angle of the throttle valve (not particularly shown) of a carburetor (not shown either) of said engine 10, and outputs an electrical signal representative thereof. A set range sensor 128 detects the set position of a manual range setting valve which is provided for the transmission mechanism 20, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 20 such as "D" range, "20" range, "L" range, "R" range, "N" range, and "P" range. And an input torque sensor 130 senses the input torque (hereinafter designated as "Ti") input to the four wheel drive power transfer device 30 from the automatic speed change device 20, and outputs an electrical signal representative thereof. The output signals of these four sensors 124, 126, 128, and 130 are fed to a transmission control device 120.

This transmission control device 120 outputs control signals for controlling the electric/hydraulic control device 110 for the four wheel drive power transfer device 30 and the electrical/hydraulic control mechanism 100 for the gear transmission mechanism 26, according to principles which incorporate the concept of the first preferred embodiment of the vehicle torque distribution device and method of the present invention, as will be explained hereinafter. No concrete illustration of the structure of any particular realization of the transmission control device 120 will be given herein, since various possibilities for the details thereof can be easily supplemented by one of ordinary skill in the electronic and computer programming art based upon the functional disclosures set out in this specification. In the first preferred embodiments of the device and the method of the present invention, the transmission control device 120 is concretely realized as a microcomputer and its associated circuitry, said micro computer operating at the behest of a control program which will not be particularly detailed, since the details thereof can likewise be easily supplemented by one of ordinary skill in the electronic and computer programming art based upon the functional disclosures set out in this specification. However, it should be particularly understood that such realizations in the micro computer form, although preferred, are not the only ways in which the transmission control device 120 can be provided; in other possible embodiments it could be constituted as an electrical device not incorporating a microprocessor. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. The system will typically also include buffers for the electrical signals outputted from the various sensors and switches 124 through 130 to the input port device, and drive circuits through which actuating electrical signals are passed from the output port device to a speed change control solenoid or solenoids of the electrical/hydraulic control mechanisms 100 for controlling the automatic speed change device 20 and to a control solenoid or the like of the electric/hydraulic control device 110 for controlling the torque transmission capacity of the clutch 60 of the four wheel drive power transfer device 30 by supplying appropriate hydraulic fluid pressures to the first effectively larger pressure chamber 76 and to the second effectively smaller pressure chamber 78. It should be understood that the transmission control device 120 generally functions so as to engage an appropriate one of the various speed stages of the gear transmission mechanism 26 of the transmission mechanism 20 according to the current values of various vehicle operating parameters such as the vehicle road speed as sensed by the road speed sensor 124, the engine load (throttle opening) as sensed by the throttle position sensor 126, and the operating range of the transmission as manually set by the vehicle driver on the setting means therefor as sensed by the set range sensor 128; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 120 generally functions as will now be explained, so as to control the torque transmission capacity of the clutch 60 of the center differential device 32 of the four wheel drive power transfer device 30, according to the current values of the torque currently being inputted to the clutch 60 of the center differential device 32 of the four wheel drive power transfer device 30, as sensed by the input torque sensor 130, and the operating range of the transmission as manually set by the vehicle driver on the setting means therefor as sensed by the set range sensor 128.

The Control According to the First Method Embodiment

In detail, when the maximum troque transmission capacity required from the clutch 60 of the center differential device 32 of the four wheel drive power transfer device 30 is relatively high, the supply of actuating hydraulic pressure to the servo device 70 is directed to the first effectively larger pressure chamber 76 thereof; while, on the other hand, when the maximum torque transmission capacity required from said clutch 60 of said center differential device 32 of said four wheel drive power transfer device 30 is relatively low, the supply of actuating hydraulic fluid pressure to said servo device 70 is directed to the second effectively smaller pressure chamber 78 thereof.

For example, referring now to the graph of FIG. 3 which shows the magnitude of the torque transmission capacity which is being caused to be provided between the clutch plate sets 66 and 68 by their being squeezed together by the pressure of the first larger raduis piston 72 against them along the vertical axis, and which shows along the horizontal axis the magnitude of the actuating hydraulic fluid pressure which is being supplied to the servo device 70 (either to the first effectively larger pressure chamber 76 or to the second effectively smaller pressure chamber 78 thereof): suppose that the maximum torque transmission capacity which is thus required to be provided by the clutch 60 of the center differential device 32 of the four wheel drive power transfer device 30, during the engagement of the first speed stage of the gear transmission mechanism 26 of the automatic speed change device 20, is represented as "Tc4"; suppose that the maximum torque transmission capacity which is thus required to be provided by said clutch 60 during the engagement of the second speed stage of said gear transmission mechanism 26 is represented as "Tc3" (where Tc3 will be less than Tc4); suppose that the maximum torque transmission capacity which is thus required to be provided by said clutch 60 during the engagement of the third speed stage of said gear transmission mechanism 26 is represented as "Tc2" (where Tc2 will be less than Tc3 and a fortiori will be less than Tc4); and suppose that the maximum torque transmission capacity which is thus required to be provided by said clutch 60 during the engagement of the fourth speed stage of said gear trasmission mechanism 26 is represented as "Tc1" (where Tc1 will be less than Tc and a fortiori will be less than Tc3 and will be even more less than Tc4). Then, according to this, when said gear transmission mechanism 26 is engaged to its first speed stage or to its second speed stage, the servo device 70 should supply the actuating hydraulic fluid pressure which it produces to the first effectively larger pressure chamber 76, thus providing a torque transmission capacity to supplied hydraulic fluid pressure characteristic as shown by the line in FIG. 3 which has the greater slope; while, on the other hand, when said gear trasmission mechanism 26 is engaged to its third speed stage or to its fourth speed stage, the servo device 70 should supply the actuating hydraulic fluid pressure which it produces to the second effectively smaller pressure chamber 78, thus providing a torque transmission capacity to supplied hydraulic fluid pressure characteristic as shown by the line in FIG. 3 which has the lesser slope.

Then, by this form of operation, when said gear transmission mechanism 26 is engaged to its first speed stage, the maximum torque transmission capacity Tc4 that ever can be required from the clutch 60 of the center differential device 32 of the four wheel drive power transfer device 30 will be produced by supply to the first effectively larger pressure chamber 76 of the servo device 70 of an actuating hydraulic fluid pressure equal to the value shown by "P3" in FIG. 3; when said gear transmission mechanism 26 is engaged to its second speed stage, the maximum troque transmission capacity Tc3 that ever can be required from said clutch 60 will be produced by supply to said first effectively larger pressure chamber 76 of an actuating hydraulic fluid pressure equal to the value shown by "P1" in FIG. 3; when said gear transmission mechanism 26 is engaged to its third speed stage, the maximum torque transmission capacity Tc2 that ever can be required from said clutch 60 will be produced by supply to the second effectively smaller pressure chamber 78, now, of an actuating hydraulic fluid pressure equal to the same above described value shown by "P3" in FIG. 3 (this particular exact value P3 is attained, in this exemplary case, because the characteristics of the servo device 70, i.e. the ratio of the effective pressure receiving areas of the first effectively larger pressure chamber 76 and the second effectively smaller pressure chamber 78, are so arranged); and when said gear transmission mechanism 26 is engaged to its fourth speed stage, the maximum torque transmission capacity Tc1 that ever can be required from said clutch 60 will be produced by supply to said second effectively smaller pressure chamber 78 of an actuating hydraulic fluid pressure equal to the value shown by "P2" in FIG. 3.

Accordingly, for example when the gear transmission mechanism 26 is engaged to its fourth speed stage (to take the first exemplary extreme case), then, since according to the principle of these first preferred embodiments of the torque distribution device and the method of operation thereof of the present invention the supply of actuating hydraulic fluid pressure to the servo device 70 is being performed to the second effectively smaller pressure chamber 78, the range of such actuating hydraulic fluid pressure that corresponds to the range of torque transmission capacity of the clutch 60 from zero to its maximum torque transmission capacity Tc1 required in this fourth speed stage is zero to P2 as seen in the FIG. 3 chart, which is a relatively wide range, which allows of good control accuracy and permits a very positive control function to be provided; whereas, if on the contrary the principle of these first preferred embodiments of the torque distribution device and the method of operation thereof of the present invention were not being employed, and the supply of actuating hydraulic fluid pressure to the servo device 70 were being performed to the first effectively larger pressure chamber 76, then the range of such actuating hydraulic fluid pressure that would correspond to the range of torque transmission capacity of the clutch 60 from zero to its maximum torque transmission capacity Tc1 required in this fourth speed stage would be zero to Px as seen in the FIG. 3 chart, which would be a relatively narrow range and would not allow of such accuracy of control, and would deteriorate the positiveness of the control function.

On the other hand, for example when the gear transmission mechanism 26 is engaged to its first speed stage (to take the exemplary opposite extreme case), then, since according to the principle of these first preferred embodiments of the torque distribution device and the method of operation thereof of the present invention the supply of actuating hydraulic fluid pressure to the servo device 70 is being performed to the first effectively larger pressure chamber 76, the range of such actuating hydraulic fluid pressure that corresponds to the range of torque transmission capacity of the clutch 60 from zero to its maximum torque transmission capacity Tc4 required in this first speed stage is zero to P3 as seen in the FIG. 3 chart, which is a relatively narrow range although still being quite wide, which allows the supplied actuating hydraulic fluid pressure not ever to be required to be extremely high; whereas, if on the contrary the principle of these first preferred embodiments of the torque distribution device and the method of operation thereof of the present invention were not being employed, and the supply of actuating hydraulic fluid pressure to the servo device 70 were being performed to the second effectively smaller pressure chamber 78, then the range of such actuating hydraulic fluid pressure that would correspond to the range of torque transmission capacity of the clutch 60 from zero to its maximum torque transmission capacity Tc4 required in this first speed stage would be zero to a value far off to the right side of the FIG. 3 chart, which would be a relatively wide range and would require the supplied actuating hydraulic fluid pressure in some cases to be extemely high, which would not be very practical from the point of view of construction of an actual transmission control system.

Similar considerations apply with regart to the intermediate cases in which the gear transmission mechanism 26 is engaged to its second speed stage, or to its third speed stage. In other words, when a relativley large maximum torque transmission capacity of the clutch 60 is required, supply of actuating hydraulic fluid pressure to the servo device 70 is performed to the first effectivley larger pressure chamber 76 thereof, thus making available a relatively large maximum torque transmission capacity without entailing a very wide range of actuating hydraulic fluid pressure variation; while, on the other hand, when a relatively small maximum torque transmission capacity of the clutch 60 is required, supply of actuating hydraulic fluid pressure to the servo device 70 is performed to the second effectively smaller pressure chamber 78 thereof, thus making available a relatively small maximum torque transmission capacity without entailing any very fine adjustment of the variation of the actuating hydraulic fluid pressure to be performed.

Figure 5:
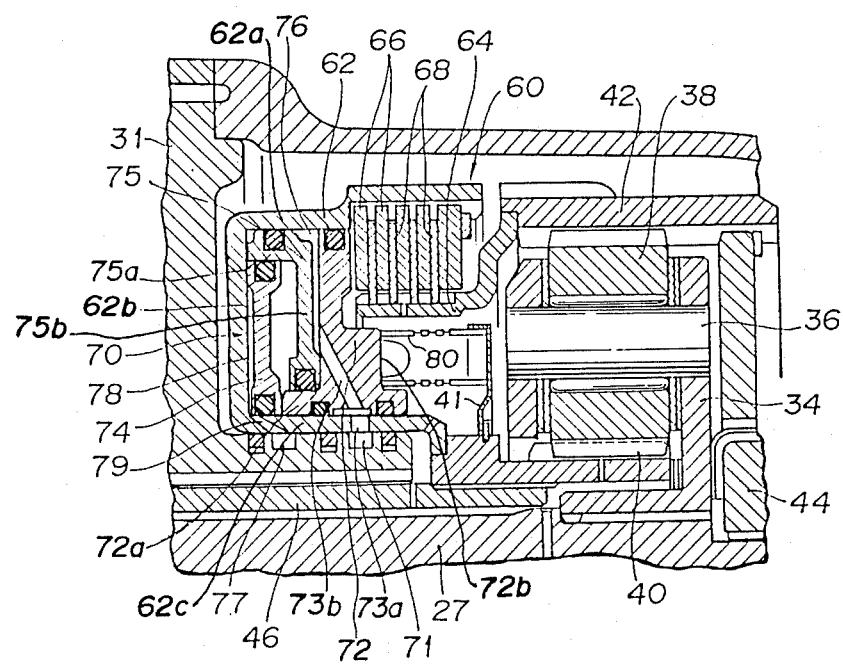
FIG. 5 is similar to FIG. 2 relating to the first preferred device and method embodiments, being a partial longitudinal sectional view, for showing details of their constructions, of a torque transfer clutch which is provided to a center differential device of the FIG. 4 power train, and of an actuating servo device for said troque transfer clutch, said torque transfer clutch and said actuating servo device being incorporated in said second preferred embodiment of the vehicle torque distribution device of the present invention.

The Construction of the Central Differential Control Clutch 60 in the Second Preferred Embodiment In FIG. 5, there is shown a cross sectional view of the four wheel drive power transfer device 30, of its central differential control clutch 60, and of a servo device 70 for said clutch 60, as incorporated in the second preferred embodiments of the torque distribution device and the method of operation thereof of the present invention; again, however, this particular arrangement should not be taken as unduly limitative of the present invention, as other possibilities for these structures could also be implemented, in alternative embodiments. In this figure and in the others relating to these second preferred device and method embodiments of the present invention, parts and gaps and spaces and so on which correspond to analogous parts and gaps and spaces and so on of the first preferred embodiment will be denoted by reference numerals like to those utilized in the figures relating to said first preferred embodiment. Here, the central differntial control clutch 60 is again shown as being a hydraulic servo type wet clutch, of substantially the same type as in the case of the first preferred embodiment, having again two sandwiched together sets 66 and 68 of clutch plates.

The servo device 70 provided for pressing and squeezing together the sets 66 and 68 of clutch plates, in these second preferred embodiments, is again of a double chamber type, but is of a different construction to the servo device 70 utilized in the first preferred embodiments; and, by contrast to said first preferred embodiments, said servo device 70 in these second preferred embodiments has a three mode functional capability. This servo device 70 comprises twin pressure chambers 76 and 78 and twin servo pistons 72 and 74, all of these members and chambers being annular and the pressure chamber 76 having the larger effective pressure receiving area while the pressure chamber 72 has the smaller effective pressure receiving area. The servo pistons 72 and 74, in series, confront the sandwiched together sets 66 and 68 of clutch plates, for opposing said clutch plate sets 66 and 68 and for pressing them together, when said servo pistons 72 and 74 are biased in their direction (rightwards in FIG. 5). And, when one or the other or, in these second preferred embodiments, both, of the pressure chambers 76 and 78 is/are pressurized with hydraulic fluid, it/they presses/press the servo piston 72 against the clutch plate sets 66 and 68 and squeezes/squeeze them together. A spring 80 (which in fact is an annular spring), which bears upon a spring retainer member 41 fitted to an extension portion of the sun gear 40, is provided for biasing said servo pistons 72 and 74 in the leftwards direction as seen in FIG. 5, so as to reduce the size of the pressure chambers 76 and 78. Thereby, when no substantial hydraulic fluid pressure is supplied to either one or both of said pressure chambers 76 and 78, under the biasing action of the spring 80 the servo pistons 72 and 74 are both biased in the leftwards direction as seen in the drawing, so as to not substantially compress the superposed sandwich of the clutch plate sets 66 and 68 and thus to let said clutch plate sets 66 and 68 be not substantially mutually engaged; and, thereby, no substantial degree of torque transmission between the sun gear 40 and the ring gear 42 of the center differential device 32 is provided. On the other hand, when a substantial degree of hydraulic fluid pressure is supplied to either or both of the pressure chambers 76 and 78, the servo piston 72 and (if the pressure chamber 78 is supplied with pressure) the servo piston 74 is/are biased, against the biasing action of the spring 80 which is overcome, in the rightwards direction as seen in the drawing, so that said servo piston 72 presses against and compresses the superposed sandwich of the clutch plate sets 66 and 68 with a force determined according to the magnitude of the pressure value(s) supplied to said pressure chamber(s) 76 and/or 78, thereby causing said clutch plate sets 66 and 68 to be mutually engaged together with a torque transmission capability determined according to said magnitude of said pressure value(s) supplied to said pressure chamber(s) 76 and/or 78, as will be explained in detail later; and, thereby, torque transmission between the sun gear 40 and the ring gear 42 of the center differential device 32 is provided, similarly with a magnitude determined according to the magnitude of the pressure value supplied to the pressure chamber(s) 76 and/or 78.

In more detail, the clutch drum 62 is formed with a hollow cylindrical portion 62a axially proximate to its right side portion as seen in FIG. 5 to which the clutch plates 66 are mounted, further is formed with a disk shaped backing portion 62b at its left side in FIG. 2 which supports said hollow cylindrical portion 62a, and yet further is formed with a second cylindrical portion 62c of yet smaller radius which joins the main body of said clutch drum 62 to the sun gear 40. The first larger radius piston 72 is formed as an abutted combination of an inner cylindrical member 72a and a toroidal disk member 72b, and the outer cylindrical surface of its said toroidal disk member 72b is slidably mounted in the inner cylindrical surface of said cylindrical drum portion 62a with a hydraulic seal therebetween being provided by a seal member, while the inner cylindrical surface of its said inner cylindrical member 72a is slidably mounted over said second cylindrical portion 62c of said clutch drum 62 with a hydraulic seal therebetween likewise being provided by a seal member. An intermediate dividing member 75 is provided, which is formed as an abutted combination of an outer cylindrical member 75a and a toroidal disk member 75b, and the inner cylindrical surface of its said toroidal disk member 75b is slidably mounted over the outer cylindrical surface of said inner cylindrical member 72a of said first larger radius piston 72 with a hydraulic seal therebetween being provided by a seal member, while the outer cylindrical surface of its said outer cylindrical member 75a is slidably mounted in said first cylindrical portion 62a of said clutch drum 62 with a hydraulic seal therebetween likewise being provided by a seal member. The second smaller radius piston 74 is formed as a toroidal disk member, with its outer radius smaller than that of the first larger radius piston 72 but with its inner radius substantially the same, and its outer cylindrical surface is slidably mounted in the inner cylindrical surface of the outer cylindrical member 75a of the intermediate dividing member 75 with a hydraulic seal therebetween being provided by a seal member, while its inner cylindrical surface is slidably mounted over the second cylindrical portion 62c of the clutch drum 62 with a hydraulic seal therebetween likewise being provided by a seal member. And, when the intermediate dividing member 75 is in its most leftwardly displaced position within the hollow cylindrical portion 62a of the clutch drum 62 as shown in FIG. 5, the left end edge of its said outer cylindrical member 75a abuts against and seals against the disk shaped backing portion 62b of said clutch drum 62. Thereby, the first effectively larger pressure chamber 76 is defined between the toroidal disk member 72b of the first larger radius piston 72 and the intermediate dividing member 75, in cooperation with the hollow cylindrical portion 62a of the clutch drum 62, and the inner cylindrical member 72a of said first larger radius piston 72; and the effective pressure receiving area of said first effectively larger pressure chamber 76 is the part of the area of the left side in FIG. 5 of said toroidal disk member 72b of said first larger radius piston 72 which is free of the inner cylindrical member 72a thereof. The second effectively smaller pressure chamber 78 is defined between the second smaller radius piston 74 and the end portion 62b of the clutch drum 62, in cooperation with the the second cylindrical portion 62c of said clutch drum 62 and the outer cylindrical member 75a of the intermediate dividing member 75; and the effective pressure receiving area of said second effectively smaller pressure chamber 78 is the area of the left side in FIG. 5 of said second smaller radius piston 74.

Figure 9:
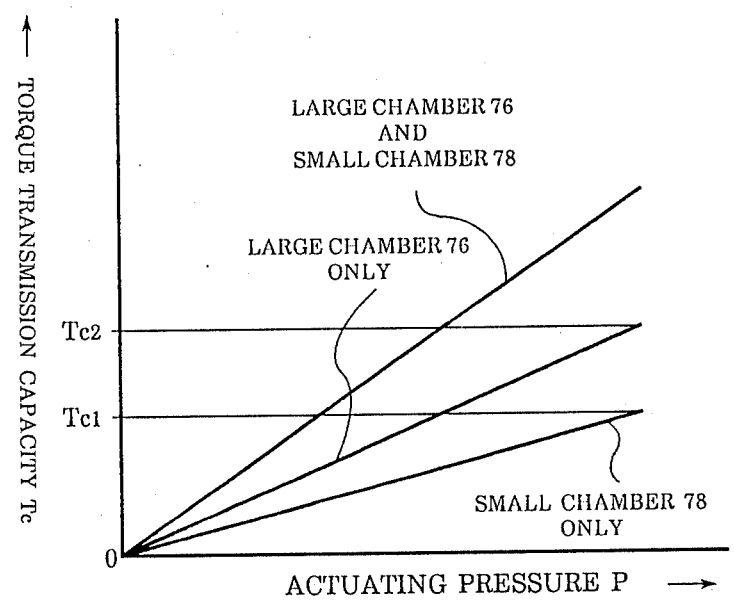
FIG. 9 is similar to FIG. 3 relating to the first preferred device and method embodiments, being a graph which shows along the vertical axis the magnitude of the torque transmission capacity which is being caused to be provided between two clutch plate sets of the FIG. 5 torque transfer clutch by their being squeezed together according to the pressure of a piston member upon them, and which shows along the horizontal axis the magnitude of the actuating hydraulic fluid pressure which is being supplied to one or another of two pressure chambers of the actuating servo device of FIG. 5, which is for providing such squeezing action by said piston, in three different operational modes of the system.

In other words, according to this construction, when actuating hydraulic fluid pressure is supplied to the first effectively larger pressure chamber 76, which when done is so done by supplying said actuating hydraulic fluid pressure via a port 71 formed in the housing 31 of this four wheel drive power transfer device 30, via a port 73a formed in the second cylindrical portion 62c of the clutch drum 62, and via a port 73b formed through said first larger radius pistom 72 itself, then the ratio of the magnitude of the torque transmission capacity thus caused to be provided between the clutch plate sets 66 and 68 by the first larger radius piston 72, which is displaced rightwards in FIG. 5 while reacting against the intermediate dividing member 75 which itself reacts against the disk shaped backing portion 62b of the clutch drum 62, squeezing said clutch plate sets 66 and 68 together, to the magnitude of the supplied actuating hydraulic fluid pressure, is determined by the effective pressure receiving area of said first larger radius piston 72, and is relatively high, as illustrated in FIG. 9 which will be described later; and, on the other hand, when actuating hydraulic fluid pressure is supplied to the effectivley smaller pressure chamber 78, which when done is so done by supplying said actuating hydraulic fluid pressure via a port 77 formed in the housing 31 of this four wheel drive power transfer device 30 and via a port 79 formed in the second cylindrical portion 62c of the clutch drum 62, then the ratio of the magnitude of the torque transmission capacity thus caused to be provided between the clutch plate sets 66 and 68 by the first larger radius piston 72, which is displaced rightwards in FIG. 5 by the pushing action of the second smaller radius piston 74 which also is displaced rightwards in FIG. 5, squeezing said clutch plate sets 66 and 68 together, to the magnitude of the supplied actuating hydraulic fluid pressure, is determined by the effective pressure receiving area of said second smaller radius piston 74 and is relatively low, as also illustrated in FIG. 9 as will be described later. Particularly in these second preferred embodiments of the slippage control system for a fluid coupling lock up clutch assembly of the present invention, by contrast to the first preferred embodiments thereof, when both actuating hydraulic fluid pressure is supplied to the first effectively larger pressure chamber 76 via the ports 71, 73a, and 73b and also the same value of actuating hydraulic fluid pressure is supplied to the second effectively smaller pressure chamber 78 via the ports 77 and 79, then the ratio of the magnitude of the torque transmission capacity thus caused to be provided between the clutch plate sets 66 and 68 by the squeezing together action for said clutch plate sets 66 and 68 caused by the first larger radius piston 72 being displaced rightwards in FIG. 5 while reacting against the intermediate dividing member 75 which itself reacts against the disk shaped backing portion 62b of the clutch drum 62, and also by the second smaller radius piston 74 also being displaced rightwards in FIG. 5 while reacting against said disk shaped backing portion 62b, to the magnitude of the supplied actuating hydraulic fluid pressure, is determined by the sum of the effective pressure receiving areas of said first larger radius piston 72 and of said second smaller radius piston 74, and is yet relatively higher, as illustrated in FIG. 9 as also will be described later.

The Electrically Actuated Electric/Hydraulic Control Device 110

The electrically actuated electric/hydraulic control device 110, to define its action in these second preferred embodiments of the present invention in a functional sense, supplies a hydraulic fluid pressure of any desired pressure level from substantially zero up to line pressure either to one or the other of the larger and the smaller pressure chambers 76 and 78 of this servo device 70, or to both said larger and said smaller pressure chambers 76 and 78 of said servo device 70 together, according to the value of an electrical control signal or signals supplied to it; as before, this electric signal or signals may be a pulse signal or signals, and the duty ratio of said pulse signal or signals may control the pressure supplied to one or the other or both of said larger and smaller pressure chambers 76 and 78 of the servo device 70, for example, as will be exemplarily disclosed in the following. Thus, by varying the value of said electrical signal or signals, it is possible to vary the degree of torque transmission between the sun gear 40 and the ring gear 42 of the center differential device 32 between substantially zero and a substantially maximum value, in each of three operational modes, in the case of these second preferred embodiments of the present invention.

Figure 6:
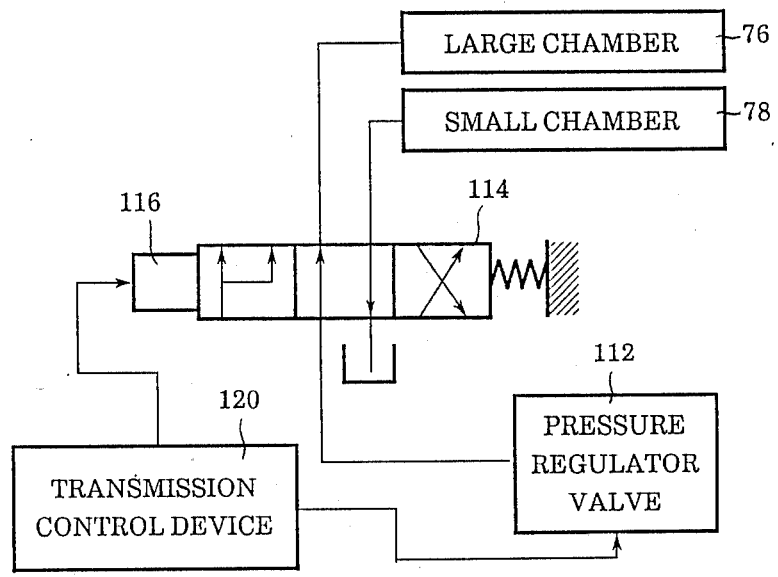
FIG. 6 is a schematic block diagrammatical drawing, showing an exemplary possible construction for an electrically actuated electric/hydraulic control device of the FIG. 4 construction, which supplies actuating hydraulic fluid pressure for controlling said actuating servo device for said torque transfer clutch of FIGS. 4 and 5.

In detail, referring now to FIG. 6, an exemplary possible construction for this electrically actuated electric/hydraulic control device 110 will now be described. This electrically actuated electric/hydraulic control device 110 incorporates a pressure regulator valve 112 and an electrically actuated hydraulic switching valve 114. The pressure regulator valve 112 may, for example, be a regulation valve of the duty ratio type, and supplies to the electrically actuated hydraulic switching valve 114 a hydraulic fluid pressure whose magnitude varies according to the value of a signal supplied to said pressure regulator valve 112 by the transmission control device 120. The electrically actuated hydraulic switching valve 114, which is actuated so as to be driven by a drive device such as a drive solenoid, is of a type which has three positions, as schematically indicated in FIG. 6: a first position in which said electrically actuated hydraulic switching valve 114 supplies the hydraulic fluid pressure with which it is supplied by said pressure regulator valve 112 to the second effectively smaller pressure chamber 78, only, while on the other hand draining the first effectively larger pressure chamber 76; a second position in which said electrically actuated hydraulic switching valve 114 supplies the hydraulic fluid pressure with which it is supplied by said pressure regulator valve 112 to the first effectively larger pressure chamber 76, only, while on the other hand draining the second effectively smaller pressure chamber 78; and a third position in which said electrically actuated hydraulic switching valve 114 supplies the hydraulic fluid pressure with which it is supplied by said pressure regulator valve 112 both to the first effectively larger pressure chamber 76 and also to the second effectively smaller pressure chamber 78. The controlling electrical signals for the pressure regulator valve 112 and for the drive solenoid 116 of the electrically actuated hydraulic switching valve 114 are suppled from a transmission control device 120, now to be explained.

The Transmission Control System

Referring back again now to FIG. 4, it will be seen that the following detectors and sensors are provided to this system. A road speed sensor 124 detects a value representative of the road speed of the vehicle by measuring the rotational speed of a member rotationally coupled to the rear wheel power output shaft 44, or the like, and outputs an electrical signal representative thereof. A throttle position sensor 126 detects a value representative of the current load on the internal combustion engine 10 by measuring the opening angle of the throttle valve (not particularly shown) of a carburetor (not shown either) of said engine 10, and outputs an electrical signal representative thereof. A set range sensor 128 detects the set position of a manual range setting valve which is provided for the transmission mechanism 20, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 20 such as "D" range, "20" range, "L" range, "R" range, "N" range, and "P" range. An input torque sensor 130 senses the input torque (hereinafter designated as "Ti") input to the four wheel drive power transfer device 30 from the automatic speed change device 20, and outputs an electrical signal representative therof. A steering angle sensor 132 senses the angle of the steering system of the vehicle to which this four wheel drive control system is fitted, and outputs an electrical signal representative thereof. The output signals of these five sensors 124, 126, 128, 130, and 132 are fed to a transmission control device 120.

This transmission control device 120 outputs control signals for controlling the electric/hydraulic control device 110 for the four wheel drive power transfer device 30 and for controlling the electrical/hydraulic control mechanism 100 for the gear transmission mechanism 26, according to principles which incorporate the concept of the second preferred embodiment of the vehicle torque distribution device and method of the present invention, as will now be explained. It should be understood that, as before, no concrete illustration of the structure of any particular realization of the transmission control device 120 will be given herein, since various possibilities for the details thereof can be easily supplemented by one of ordinary skill in the electronic and computer programming art based upon the functional disclosures set out in this specification. Again, in these second preferred embodiments of the device and the method of the present invention, the transmission control device 120 is concretely realized as a micro computer and its associated circuitry, said micro computer operating at the behest of a control program which will not be completely particularly detailed, since many of the details thereof can likewise be easily supplemented by one of ordinary skill in the electronic and computer programming art based upon the functional disclosures set out in this specification. However, as before, it should be particularly understood that such realizations in the micro computer form, although preferred, are not the only ways in which the transmission control device 120 can be provided; in other possible embodiments it could be constituted as an electrical device not incorporating a microprocessor. In the preferred case, as before, this microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. The system will typically also include buffers for the electrical signals ouputted from the various sensors and switches 124 through 132 to the input port device, and drive circuits through which actuating electrical signals are passed from the output port device to a speed change control solenoid or solenoids of the electrical/hydraulic control mechanism 100 for controlling the automatic speed change device 20 and to a control solenoid or the like of the electric/hydraulic control device 110 for controlling the torque transmission capacity of the clutch 60 of the four wheel drive power transfer device 30 by supplying appropriate hydraulic fluid pressures to the first effectively larger pressure chamber 76 and/or to the second effectively smaller pressure chamber 78. It should be understood that, as before, the transmission control device 120 generally functions so as to engage an appropriate one of the various speed stages of the gear transmission mechanism 26 of the transmission mechanism 20 according to the current values of various vehicle operating parameters such as the vehicle road speed as sensed by the road speed sensor 124, the engine load (throttle opening) as sensed by the throttle position sensor 126, and the operating range of the transmission as manually set by the vehicle driver on the setting means therefor as sensed by the set range sensor 128; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 120 generally functions as will now be explained, so as to control the torque transmission capacity of the clutch 60 of the center differential device 32 of the four wheel drive power transfer device 30, according to the current values of the torque Ti currently being inputted to the clutch 60 of the center differential device 32 of the four wheel drive power transfer device 30, as sensed by the input torque sensor 130, the operating range of the transmission as manually set by the vehicle driver on the setting means therefor as sensed by the set range sensor 128, and the steering angle of the steering system of the vehicle to which this four wheel drive control system is fitted, as sensed by the steering angle sensor 132.

The Control According to the Second Method Embodiment

In summary, when the maximum torque transmission capacity required from the clutch 60 of the center differential device 32 of the four wheel drive power transfer device 30 is relatively high, the supply of actuating hydraulic fluid pressure to the servo device 70 is directed to the first effectively larger pressure chamber 76 thereof and also is directed to the second effectively smaller pressure chamber 78 thereof; and, when the maximum torque transmission capacity required from said clutch 60 of said center differential device 32 of said four wheel drive power transfer device 30 is relatively intermediate, the supply of actuating hydraulic fluid pressure to the servo device 70 is directed to the first effectively larger pressure chamber 76 thereof, but not to the second effectively smaller pressure chamber 78 thereof; while, on the other hand, when the maximum torque transmission capacity required from said clutch 60 of said center differential device 32 of said four wheel drive power transfer device 30 is relatively low, the supply of actuating hydraulic fluid pressure to said servo device 70 is directed to the second effectively smaller pressure chamber 78 thereof, but not to the first effectively larger pressure chamber 76 thereof.

Figure 7:
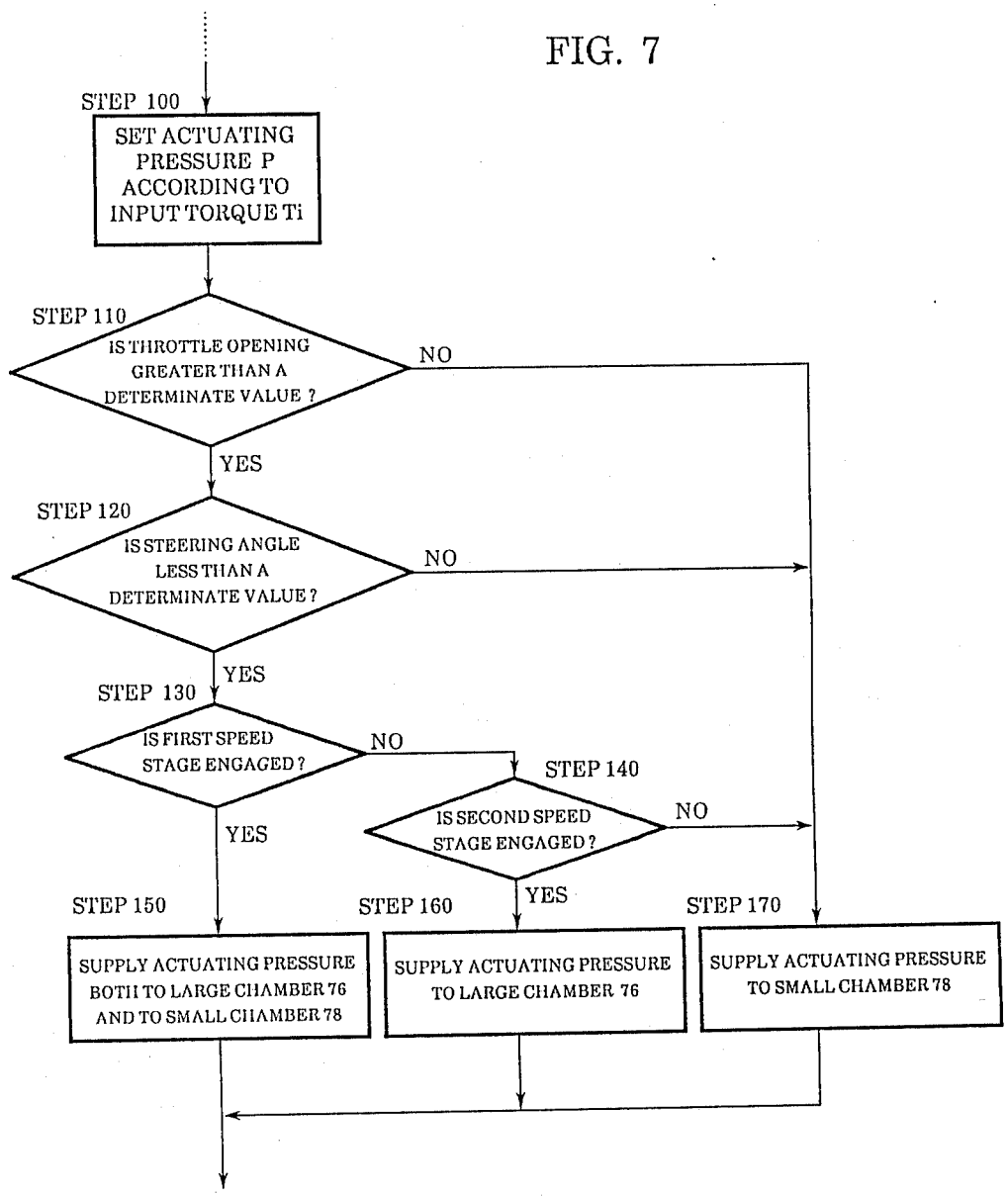
FIG. 7 is a flow chart of a portion of a program which controls a microcomputer incorporated in a transmission control device shown in FIG. 4, for explaining the principles of the control exercised thereby.

Now, in FIG. 7, a fragmentary flow chart is shown for a portion of the aforementioned control program which directs the operation of the transmission control device 120, according to the second preferred embodiment of the four wheel drive vehicle torque distribution device of the present invention, so as to realize the second preferred embodiment of the four wheel drive vehicle torque distribution method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 7 only shows the portion of the control program of the transmission control device 120 which controls the supply of actuating hydraulic fluid pressure to the clutch 60 of the center differential device 32 of the four wheel drive power transfer device 30, i.e. to the electrically actuated electric/hydraulic control device 110; said FIG. 7 flow chart therefore does not show the portion of said control program relating to the control provided for the gear transmission mechanism 26 of the transmission mechanism 20. This fragment will be sufficient for exemplifying the principles of the present invention. This program portion is executed at regular intervals of for example a few milliseconds, of course after the engine 1 is started as the vehicle incorporating it is driven.

Figure 8:
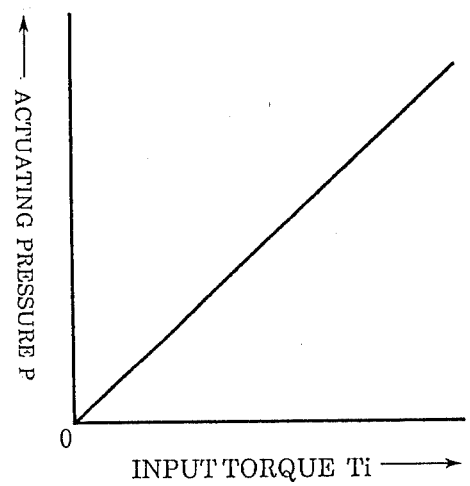
FIG. 8 is a graph which shows the torque Ti inputted to the torque transfer clutch of FIGS. 4 and 5 along the horizontal axis, and the corresponding value of the actuating pressure P for the actuating servo device of said FIGS. 4 and 5 for said torque transfer clutch, as determined by the first block of said process whose flow chart is shown in FIG. 7, along the vertical axis.

In the first step ST100 to which control is passed after the start of this program fragment, the transmission control device 120 sets the actuating pressure P for the servo device 70 for the clutch 60 of the center differential device 32 of the four wheel drive power transfer device 30 according to the current value of the torque Ti which is currently being inputted to said clutch 60, for example according to a proportional relationship as indicated by the graph of FIG. 8 which is a graph which shows said torque Ti inputted to the clutch 60 along the horizontal axis and the corresponding value of the actuating pressure P for the servo device 70 along the vertical axis; and then the flow of control passes next to the next decision step ST110.

In this decision step ST110, a decision is made as to whether or not the current value of the throttle opening of the carburetor of the engine 10, as detected by the throttle position sensor 126 therefor, is greater than a determinate throttle opening value. If the result of this decision is YES, so that in fact said current throttle opening value is greater than said determinate value, then the flow of control passes next to the decision step ST120; but, if the result of this decision is NO, so that in fact said current throttle opening value is less than said determinate value, then the flow of control passes next to the step ST170.

In the decision step ST120, a decision is made as to whether or not the current value of the steering angle of the steering system of the vehicle, as detected by the steering angle sensor 132 therefor, is less than a determinate steering angle value. If the result of this decision is YES, so that in fact said current steering angle value is less than said determinate value, then the flow of control passes next to the decision step ST130; but, if the result of this decision is NO, so that in fact said current steering angle value is greater than said determinate value, then the flow of control passes next to the step ST170.

In the decision step ST130, at which point of the flow chart it has been determined that the current value of the throttle opening is greater than said determinate value therefor and also the current value of the steering angle is less than said determinate value therefor, which are the only circumstances in which it is even possible to contemplate any action other than supplying the actuating pressure P for the servo device 70 for the clutch 60 of the center differential device 32 of the four wheel drive power transfer device 30 to the second effectively smaller pressure chamber 78 thereof, a decision is made as to whether or not the current speed stage to which the gear transmission mechanism 26 of the automatic transmission 20 is engaged, by the action of the electrical/hydraulic control mechanism 100, is the first speed stage. If the result of this decision is YES, so that in fact said gear transmission mechanism 26 is currently engaged to its first speed stage, then the flow of control passes next to the step ST150; but, if the result of this decision is NO, so that in fact said gear transmission mechanism 26 is not currently engaged to its first speed stage, then the flow of control passes next to the decision step ST140.

In this decision step ST140, a decision is made as to whether or not the current speed stage to which the gear transmission mechanism 26 of the automatic transmission 20 is engaged, by the action of the electrical/hydraulic control mechanism 100, is the second speed stage. If the result of this decision is YES, so that in fact said gear transmission mechanism 26 is currently engaged to its second speed stage, then the flow of control passes next to the step ST160; but, if the result of this decision is NO, so that in fact said gear transmission mechanism 26 is not currently engaged to its second speed stage, then the flow of control passes next to the step ST170.

In the step ST150, at this point it has been determined that the gear transmission mechanism 26 is currently engaged to its first speed stage, and also the current value of the throttle opening is greater than said determinate value therefor and the current value of the steering angle is less than said determinate value therefor, so that the maximum possible maximum torque transmission capacity is required from the clutch 60. Therefore, in this step, the electrically actuated electric/hydraulic control device 110 is so operated by the transmission control device 120 as to switch its electrically actuated hydraulic switching valve 114 so as to supply the hydraulic fluid pressure which is being generated by the pressure regulator valve 112 both to the first effectively larger pressure chamber 76 and also to the second effectively smaller pressure chamber 78; and then the flow of control passes next to leave this program fragment, without doing anything further. Thereby, in this case, for a given value of actuating pressure P for the servo device 70 for the clutch 60 as produced by the pressure regulator valve 112, a maximum value of squeezing force is produced for engaging said clutch 60, and a maximum value of maximum torque transmission capacity is caused to be provided by said clutch 60.

On the other hand, in the step ST150, at this point it has been determined that the gear transmission mechanism 26 is currently engaged to its second speed stage, and also the current value of the throttle opening is greater than said determinate value therefor and the current value of the steering angle is less than said determinate value therefor, so that a somewhat less but still relatively large maximum torque transmission capacity is required from the clutch 60. Therefore, in this step, the electrically actuated electric/hydraulic control device 110 is so operated by the transmission control device 120 as to switch its electrically actuated hydraulic switching valve 114 so as to supply the hydraulic fluid pressure which is being generated by the pressure regulator valve 112 only to the first effectively larger pressure chamber 76 but not to the second effectively smaller pressure chamber 78; and then the flow of control passes next to leave this program fragment, without doing anything further. Thereby, in this case, for a given value of actuating pressure P for the servo device 70 for the clutch 60 as produced by the pressure regulator valve 112, a medium value of squeezing force is produced for engaging said clutch 60, and a medium value of maximum torque transmission capacity is caused to be provided by said clutch 60.

In all other cases, the flow of control passes to the step ST150, at which point it has therefore been determined either that the gear transmission mechanism 26 is not currently engaged to its first or to its second speed stage, or that the current value of the throttle opening is less than said determinate value therefor or that the current value of the steering angle is greater than said determinate value therefor or both; so that, in any event, only a relatively small maximum torque transmission capacity is required from the clutch 60. Therefore, in this step, the electrically actuated electric/hydraulic control device 110 is so operated by the transmission control device 120 as to switch its electrically actuated hydraulic switching valve 114 so as to supply the hydraulic fluid pressure which is being generated by the pressure regulator valve 112 only to the second effectively larger pressure chamber 78 but not to the first effectively smaller pressure chamber 76; and then the flow of control passes next to leave this program fragment, without doing anything further. Thereby, in this case, for a given value of actuating pressure P for the servo device 70 for the clutch 60 as produced by the pressure regulator valve 112, a low value of squeezing force is produced for engaging said clutch 60, and a low value of maximum torque transmission capacity is caused to be provided by said clutch 60.

Figure 4:
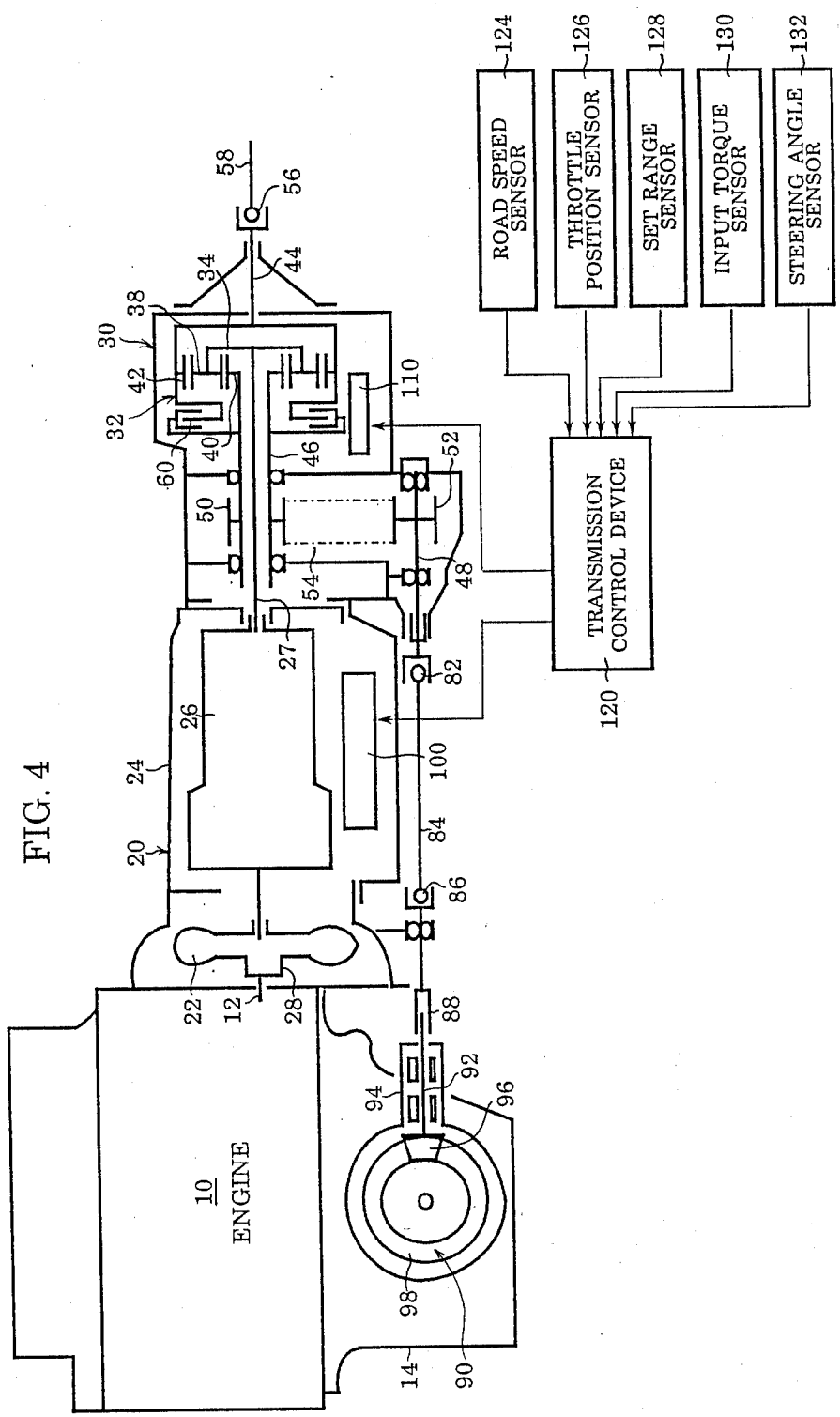
FIG. 4 is similar to FIG. 1 relating to the first preferred device and method embodiments, being a schematic longitudinal skeleton view of a vehicle power train and of a control system therefor which incorporate the second preferred embodiment of the vehicle torque distribution device of the present invention, for practicing the second preferred method embodiment, in two different operation modes of the system.

This program fragment is repeated fairly frequently, at all times when the vehicle incorporating the power train of FIG. 4 is being operated.

Thus, referring now to the graph of FIG. 9 which, like FIG. 3 for the first preferred embodiments, shows the magnitude of the torque transmission capacity which is being caused to be provided between the clutch plate sets 66 and 68 by their being squeezed together by the pressure of the first larger radius piston 72 against them along the vertical axis, and shows along the horizontal axis the magnitude of the actuating hydraulic fluid pressure which is being supplied to the servo device 70 (to the first effectively larger pressure chamber 76 and/or to the second effectively smaller pressure chamber 78 thereof) it is seen that, for a given value of actuating hydraulic fluid pressure P supplied by said servo device 70, the actual value of the force with which the plates 66 and 68 of the clutch 60 are pressed together is varied, according to the operational state of the vehicle, i.e. according to the current conditions of the throttle opening of the engine 100, of the steering angle of the steering system, and of the engagement of the automatic transmission mechanism 20. Thus, according to this, when said gear transmission mechanism 26 is engaged to its first speed stage and also the throttle opening is relatively high and the steering angle is relatively low, the servo device 70 should supply the actuating hydraulic fluid pressure which it produces both to the first effectively larger pressure chamber 76 and also to the second effectively smaller pressure chamber 78 thus providing a torque transmission capacity to supplied hydraulic fluid pressure characteristic as shown by the line in FIG. 9 which has the greatest slope; and, when said gear transmission mechanism 26 is engaged to its second speed stage and also the throttle opening is relatively high and the steering angle is relatively low, the servo device 70 should supply the actuating hydraulic fluid pressure which it produces only to the first effectively larger pressure chamber 76 but not to the second effectively smaller pressure chamber 78, thus providing a torque transmission capacity to supplied hydraulic fluid pressure characteristic as shown by the line in FIG. 9 which has the intermediate slope; while, on the other hand, when said gear transmission mechanism 26 is engaged to its third speed stage or to its forth speed stage, or when although said gear transmission mechanism 26 is engaged to its first speed stage or to its second speed stage the throttle opening is relatively low or the steering angle is relatively high, the servo device 70 should supply the actuating hydraulic fluid pressure which it produces only to the second effectively smaller pressure chamber 78 but not to the first effectively larger pressure chamber 76, thus providing a torque transmission capacity to supplied hydraulic fluid pressure characteristic as shown by the line in FIG. 9 which has the least slope.

In other words, when a relatively large maximum torque transmission capacity of the clutch 60 is required, supply of actuating hydraulic fluid pressure to the servo device 70 is performed both to the first effectively larger pressure chamber 76 thereof and also to the second effectively smaller pressure chamber 78 thereof, thus making available a relatively large maximum torque transmission capacity without entailing a very wide range of actuating hydraulic fluid pressure variation; and, when an intermediate maximum torque transmission capacity of the clutch 60 is required, supply of actuating hydraulic fluid pressure to the servo device 70 is performed only to the first effectively larger pressure chamber 76 thereof but not to the second effectively smaller pressure chamber 78 thereof, thus making available an intermediate maximum torque transmission capacity without entailing a very wide range of actuating hydraulic fluid pressure variation and without entailing any requirement for very fine control of said actuating hydraulic fluid pressure; while, on the other hand, when a relatively small maximum torque transmission capacity of the clutch 60 is required, supply of actuating hydraulic fluid pressure to the servo device 70 is performed only to the second effectively smaller pressure chamber 78 thereof but not to the first effectively larger pressure chamber 76 thereof, thus making available a relatively small maximum torque transmission capacity without entailing any very fine adjustment of the variation of the actuating hydraulic fluid pressure to be performed. Thus, in summary, the servo pressure supplied is selected according to the torque transmission range required, so that the maximum transmission capacity Tc of the clutch 60 is controlled appropriately by a simplified form of hydraulic fluid pressure control. When only the first effectively larger pressure chamber 76 or the second effectively smaller pressure chamber 78 is being supplied with the actuating hydraulic fluid pressure P, as compared with the case when both said chambers 76 and 78 are supplied, the change in maximum torque transmission capacity of the clutch 60 for a given change in the actuating hydraulic fluid pressure therefor is less, and accordingly the control of said maximum torque transmission capacity of the clutch 60 is more accurate, and can be performed more appropriately to the operational conditions of the vehicle.

Conclusion

It is acceptable, according to the principle of the present invention if the constructional details of the system are varied, although the shown ones are considered to be preferred. For example, the friction engaging device for providing torque distribution between the pair of front wheels of the vehicle and the pair of rear wheels of the vehicle could, in other embodiments, be a clutch provided in the power transmission path either to the pair of front vehicle wheels or to the pair of rear vehicle wheels and restricting or controlling the amount of torque supplied to its pair of vehicle wheels, rather than being a central differential control clutch like the clutch 60 of the shown preferred embodiments. Other modifications could also be conceived of. Therefore, although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a four wheel drive vehicle with a front wheel propeller shaft for driving two front wheels, a rear wheel propeller shaft for driving two rear wheels, and an engine, rotational power from said engine being provided to the combination of the front wheels of said vehicle and also to the combination of the rear wheels of said vehicle, and further comprising friction engaging mechanism, which controls drive torque distribution to at least one of said front and said rear vehicle wheel combinations, and a servo device which receives an actuating hydraulic fluid pressure and which applies an engaging force to said friction engaging mechanism so as to cause said friction engaging mechanism to be endowed with torque transmission capacity, said engaging force for said friction engaging mechanism and the maximum torque transmission capacity of said friction engaging mechanism thus provided both increasing monotonically according to increase of said actuating hydraulic fluid pressure; said servo device comprising: a first piston which partially serves to define a first pressure chamber, and which when impelled by hydraulic fluid pressure in said first pressure chamber in the direction to increase the volume of said first pressure chamber, provides such engaging force for said friction engaging mechanism; and a second piston which partially serves to define a second pressure chamber, and which, when impelled by hydraulic fluid pressure in said second pressure chamber in the direction to increase the volume of said second pressure chamber, provides such engaging force for said friction engaging mechanism; and wherein, when said actuating hydraulic fluid pressure is supplied to a first combination and to a second combination of said first pressure chamber and said second pressure chamber, the relationships between the magnitude of said engaging hydraulic fluid pressure and said engaging force for said friction engaging mechanism and the maximum torque transmission capacity of said friction engaging mechanism differ:

a torque distribution method, wherein when there exists a requirement for a first relationship between the magnitude of said engaging hydraulic fluid pressure and said engaging fore for said friction engaging mechanism and the maximum torque transmission capacity of said friction engaging mechanism, said actuating hydraulic fluid pressure is supplied to said first combination of said first pressure chamber and said second pressure chamber; while, when there exists a requirement for a second relationship between the magnitude of said engaging hydraulic pressure and said engaging force for said friction engaging mechanism and the maximum torque transmission capacity of said friction engaging mechanism, said second relationship being different from said first relationship, said actuating hydraulic fluid pressure is supplied to said second combination of said first pressure chamber and said second pressure chamber.

2. A torque distribution method according to claim 1, wherein said first combination of said first pressure chamber and said second pressure chamber is said first pressure chamber, and said second combination of said first pressure chamber and said second pressure chamber is said second pressure chamber.

3. A torque distribution method according to claim 1, wherein said first combination of said first pressure chamber and said second pressure chamber is said first pressure chamber, and said second combination of said first pressure chamber and said second pressure chamber is said first pressure chamber and said second pressure chamber.

4. A torque distribution method according to any one of claim 1 through claim 3, wherein the effective pressure receiving area which said first piston presents to said first pressure chamber is substantially different from the effective pressure receiving area which said second piston presents to said second pressure chamber.

5. A torque distribution method according to any one of claim 1 through claim 3, wherein, when said actuating hydraulic fluid pressure is supplied to said first pressure chamber, to said second pressure chamber, and to said first pressure chamber and said second pressure chamber, the relationships between the magnitude of said engaging hydraulic fluid pressure and said engaging force for said friction engaging mechanism and the maximum torque transmission capacity of said friction engaging mechanism all differ; and wherein, when there exists a requirement for a first relationship between the magnitude of said engaging hydraulic fluid pressure and said engaging force for said friction engaging mechanism and the maximum torque transmission capacity of said friction engaging mechanism, said actuating hydraulic fluid pressure is supplied to said first pressure chamber; when there exists a requirement for a second relationship between the magnitude of said engaging hydraulic fluid pressure and said engaging force for said friction engaging mechanism and the maximum torque transmission capacity of said friction engaging mechanism, said second relationship being different from said first relationship, said actuating hydraulic fluid pressure is supplied to said second pressure chamber; and, when there exists a requirement for a third relationship between the magnitude of said engaging hydraulic fluid pressure and said engaging force for said friction engaging mechanism and the maximum torque transmission capacity of said friction engaging mechanism, said third relationship being different from said first relationship and said second relationship, said actuating hydraulic fluid pressure is supplied to said first pressure chamber and also to said second pressure chamber.

6. A torque distribution method according to claim 4 wherein, when said actuating hydraulic fluid pressure is supplied to said first pressure chamber, to said second pressure chamber, and to said first pressure chamber and said second pressure chamber, the relationships between the magnitude of said engaging hydraulic fluid pressure and said engaging force for said friction engaging mechanism and the maximum torque transmission capacity of said friction engaging mechanism all differ; and wherein, when there exists a requirement for a first relationship between the magnitude of said engaging hydraulic fluid pressure and said engaging force for said friction engaging mechanism and the maximum torque transmission capacity of said friction engaging mechanism, said actuating hydraulic fluid pressure is supplied to said first pressure chamber; when there exists a requirement for a second relationship between the magnitude of said engaging hydraulic fluid pressure and said engaging force for said friction engaging mechanism and the maximum torque transmission capacity of said friction engaging mechanism, said second relationship being different from said first relationship, said actuating hydraulic fluid pressure is supplied to said second pressure chamber; and, when there exists a requirement for a third relationship between the magnitude of said engaging hydraulic fluid pressure and said engaging force for said friction engaging mechanism and the maximum torque transmission capacity of said friction engaging mechanism, said third relationship being different from said first relationship and said second relationship, said actuating hydraulic fluid pressure is supplied to said first pressure chamber and also to said second pressure chamber.

* * * * *